(12) United States Patent
Onohara

(10) Patent No.: US 7,467,808 B2
(45) Date of Patent: Dec. 23, 2008

(54) STEERING WHEEL WITH AIRBAG APPARATUS

(75) Inventor: Keisuke Onohara, Tokyo (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 11/495,592

(22) Filed: Jul. 31, 2006

(65) Prior Publication Data

US 2007/0029766 A1 Feb. 8, 2007

(30) Foreign Application Priority Data

Aug. 5, 2005 (JP) ............................. 2005-228355

(51) Int. Cl.
*B60R 21/16* (2006.01)

(52) U.S. Cl. .................................... 280/731

(58) Field of Classification Search ................ 280/731, 280/728.3; 200/64.54, 61.55
See application file for complete search history.

(56) References Cited

U.S. PATENT DOCUMENTS

| | | | | |
|---|---|---|---|---|
| 3,801,123 A | * | 4/1974 | Jira | 280/731 |
| 3,822,894 A | * | 7/1974 | Muller et al. | 280/731 |
| 3,843,152 A | * | 10/1974 | Nonaka | 280/731 |
| 6,139,051 A | | 10/2000 | Fujita | |
| 6,161,863 A | | 12/2000 | Fujita et al. | |
| 6,164,690 A | | 12/2000 | Vian | |
| 6,299,201 B1 | | 10/2001 | Fujita | |
| 6,478,330 B2 | | 11/2002 | Fujita | |
| 6,626,458 B2 | * | 9/2003 | Fujita et al. | 280/731 |

FOREIGN PATENT DOCUMENTS

| | | |
|---|---|---|
| EP | 0 560 355 | 3/1993 |
| EP | 1 043 198 A1 | 10/2000 |
| JP | H06-312643 | 11/1994 |
| JP | H07-101340 | 4/1995 |
| JP | H09-272391 | 10/1997 |
| JP | H10-273057 | 10/1998 |
| JP | H11-144555 | 5/1999 |
| JP | 2000-025548 | 1/2000 |
| JP | 2003-118526 | 4/2003 |
| JP | 2003-220956 | 8/2003 |

* cited by examiner

*Primary Examiner*—John Q. Nguyen
*Assistant Examiner*—Robert A. Coker
(74) *Attorney, Agent, or Firm*—Manabu Kanesaka

(57) ABSTRACT

To provide a steering wheel and an airbag apparatus including a module cover, a portion thereof is operable to prevent an interior of the airbag apparatus from being viewed through a gap between the module cover and a spoke of the steering wheel. A projecting strip extending from an occupant side of a lower spoke of a steering wheel is configured to face the gap between the occupant side of the spoke and a lower rim of the module cover extending from the rear of the module cover.

11 Claims, 4 Drawing Sheets

STEERING WHEEL WITH AIRBAG APPARATUS

BACKGROUND OF THE INVENTION

The present invention relates to vehicular steering wheels, and in particular, to a steering wheel with a centrally disposed airbag apparatus for restraining an occupant.

Steering wheels with an airbag apparatus are sometimes known to have a cover for preventing the interior of the airbag apparatus from being viewed through a gap between a module cover of the airbag apparatus and spokes that may comprise the steering wheel.

FIG. 4 is a perspective view of a module cover disclosed in Japanese Unexamined Patent Application Publication No. 2000-25548. The module cover 60 has a downward portion 62 projected from a lower spoke engaging portion 61 that points down, i.e., in a so called six o'clock position, when the steering wheel is in a position to direct a vehicle straight ahead. The downward portion 62 functions as a concealer, preventing the interior of the airbag apparatus from being viewed.

The airbag apparatus disclosed above is of a type in which the upper surface of the module cover connects to the upper surface of the spoke. Therefore, the concealing structure cannot be applied to a steering wheel and airbag apparatus as disclosed in Japanese Patent Application Publication No. 2003-118526, in which an airbag apparatus projects from the spoke toward the occupant without a cover.

To perform a concealing function, Japanese Patent Application Publication No. 2003-118526 discloses a separate cover mounted around the outer periphery of a module cover. The assembly and installation of this design is time and labor intensive. Furthermore, the cover and module cover lack a sense of unity and aesthetic appeal.

Accordingly, it is an object of the present invention to provide a steering wheel with an airbag apparatus in which the interior of the airbag apparatus is prevented from being viewed through the gap between a module cover and a spoke even if the module cover is disposed in such a manner as to project from the spoke, and which is easy to manufacture.

SUMMARY OF THE INVENTION

A steering wheel with an airbag apparatus according to the present invention includes an airbag apparatus disposed substantially in the center of the steering wheel, the steering wheel comprising spokes. The airbag apparatus includes a module cover operable to conceal the interior of the airbag apparatus and further comprises an outer periphery that covers the spokes. In addition, a concealer is disposed at the gap between the outer periphery of the module cover and the surface of the spoke adjacent to an occupant.

The concealer is constructed of a projecting strip disposed at a surface of a spoke adjacent to the occupant and an outer rim of the module cover. Further, the outer rim of the module cover is disposed close to a side of the projecting strip that is adjacent to the outer periphery of the steering wheel.

Another aspect includes the concealer disposed at the gap between a downward spoke of the steering wheel and the module cover at a position wherein the steering wheel is operable to guide the vehicle comprising the apparatus straight ahead.

A further aspect of the invention has a concealer constructed of a projecting strip disposed on the occupant side of the spokes and the outer rim of the module cover disposed close to the side of the projecting strip adjacent to the outer periphery of the module cover.

The concealer is operable to prevent the interior of the airbag apparatus from being viewed. This structure eliminates the need for mounting a separate blind cover to the module cover, facilitating manufacture, and providing an aesthetic appearance.

Another aspect of the present invention includes a horn switch, disposed at or in the vicinity of the spokes that can be prevented from being viewed.

It is particularly preferable to dispose the concealer at a spoke in the so called six o'clock position. The steering wheel and airbag apparatus of the present invention prevent the interior of the airbag apparatus from being viewed not only when a spoke is in a six o'clock position, but also when the steering wheel is turned approximately 90 degrees to a three o'clock or nine o'clock position.

DETAILED DESCRIPTION OF PREFERRED EMBODIMENTS

An embodiment of the present invention will be described hereinbelow with reference to the drawings.

Figure 1:
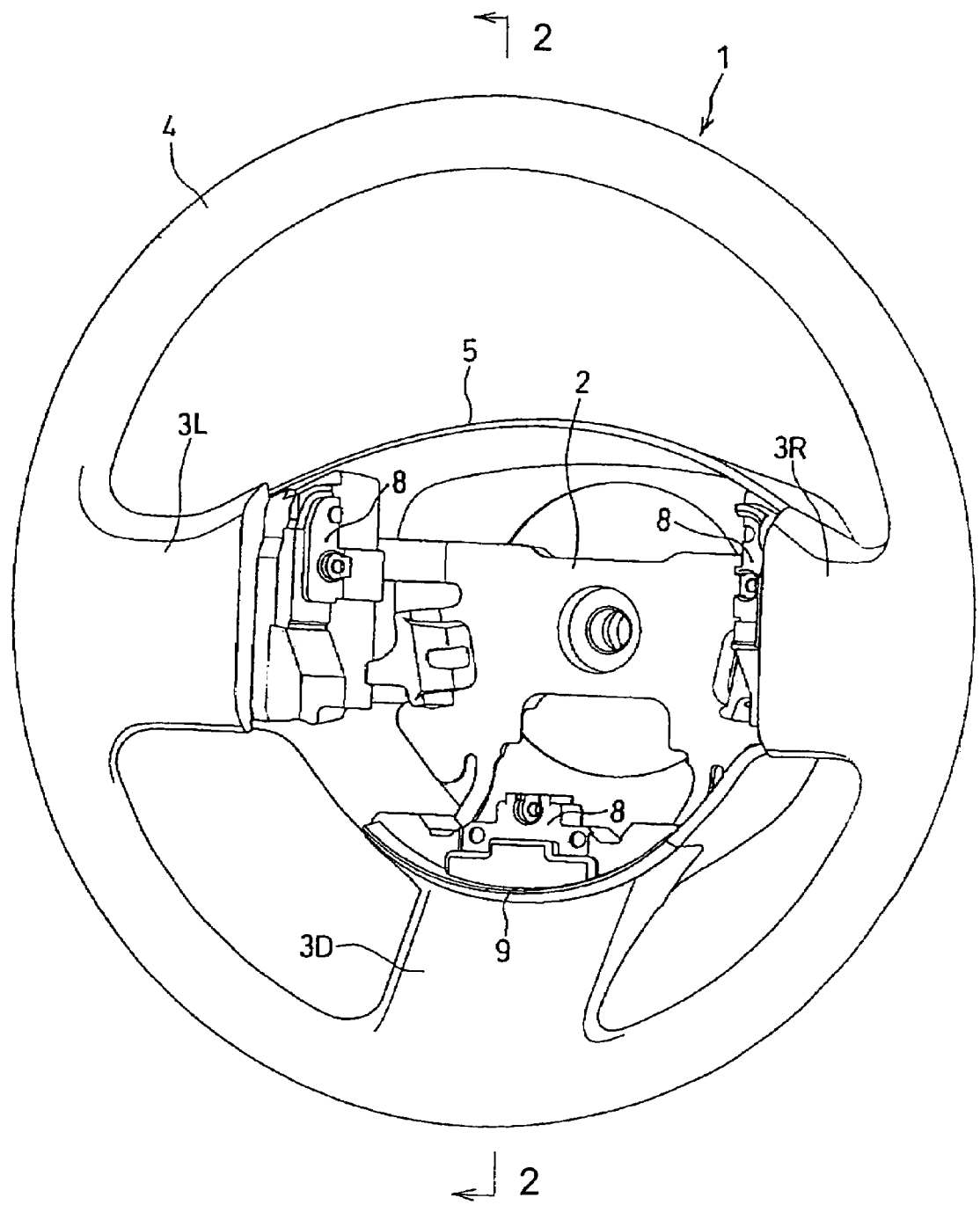
FIG. 1 is a perspective view of a steering wheel with an airbag apparatus according to an embodiment of the invention.
Figure 2:
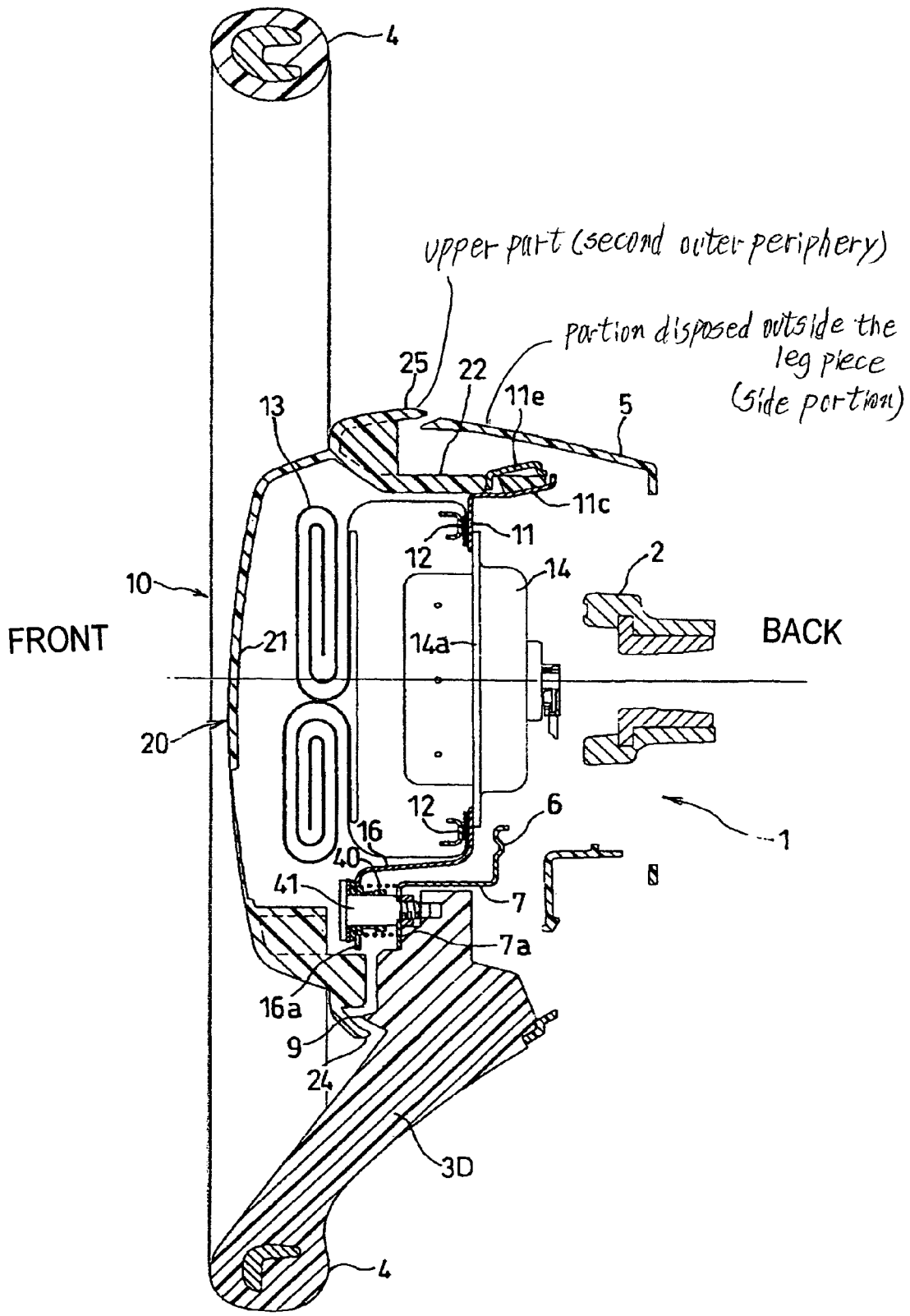
FIG. 2 is a longitudinal sectional view of the steering wheel with an airbag apparatus of FIG. 1.
Figure 3:
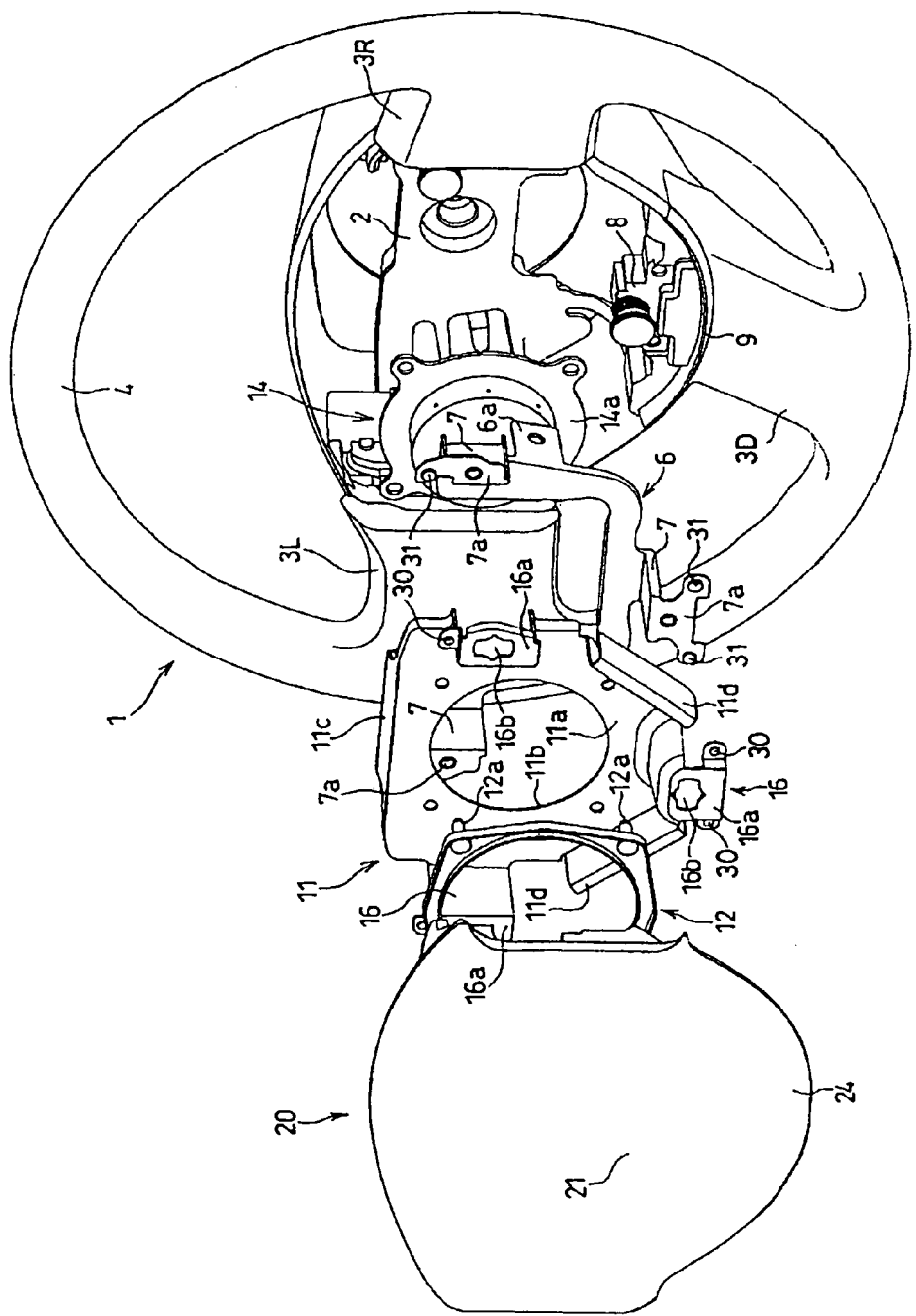
FIG. 3 is an exploded perspective view of the steering wheel with an airbag apparatus of FIG. 1.
Figure 4:
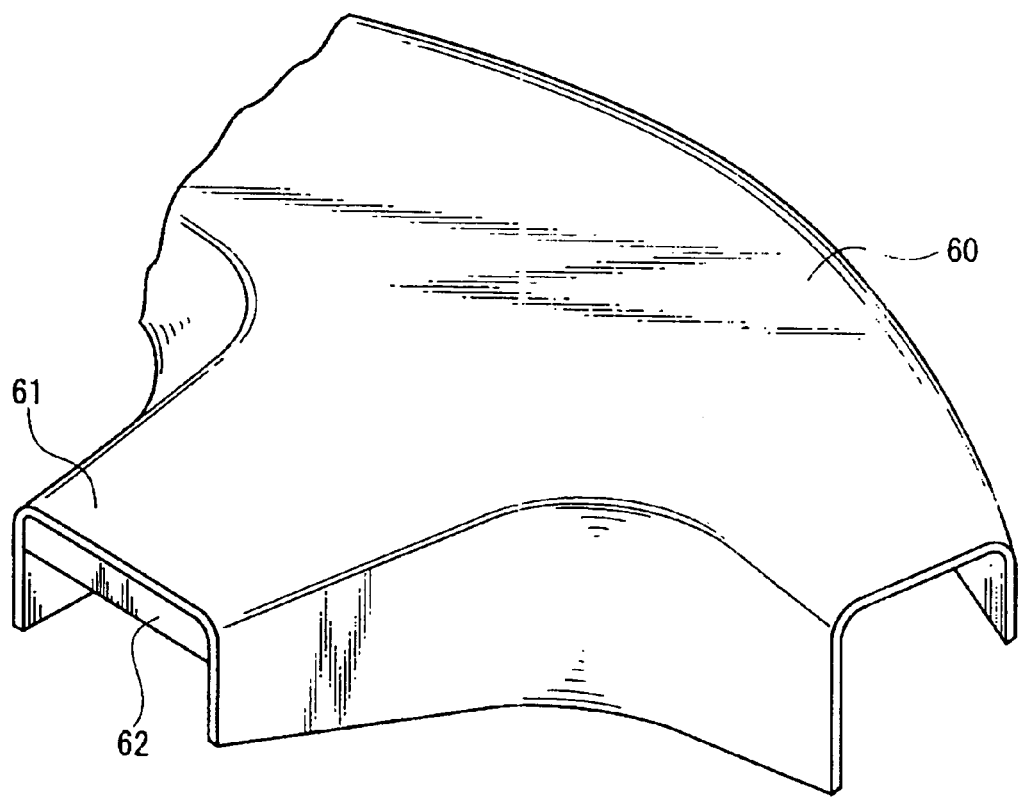
FIG. 4 is a perspective view of a module cover according to a related art.

FIG. 1 is a perspective view of a steering wheel 1 with an airbag apparatus according to the invention, with the airbag removed. FIG. 2 is a longitudinal sectional view of the steering wheel 1 with an airbag apparatus 10 (taken along line 2-2 of FIG. 1). FIG. 3 is an exploded perspective view of the steering wheel 1 and airbag apparatus 10.

The vertical direction and the lateral direction in the following description indicate those in a steering wheel plane when viewed from the occupant, wherein the steering wheel 1 is in a position in which a vehicle housing the steering wheel and airbag apparatus is driving straight ahead. Front-back positions indicate the directions relative to the steering wheel.

FIG. 1 illustrates a steering wheel 1 of what is called a three-spoke type and includes spokes 3L, 3R, and 3D extending from a substantially central steering base 2 in three directions, to the right and left (in the directions of so called three o'clock and nine o'clock) and downward (in the direction of six o'clock). The distal ends of the spokes 3L, 3R, and 3D connect to a ring 4 around an outer periphery of the steering wheel 1. The steering base 2 may be joined to the distal end of a steering shaft (not shown). A back cover 5 may be mounted in such a manner as to cover the steering base 2 from the back (from the side opposite to the occupant).

FIG. 2 illustrates an airbag apparatus 10 mounted on the front side of the steering base 2, the side adjacent to the occupant. The airbag apparatus 10 of this embodiment is mounted to the steering base 2 in such a manner as to move in a front-back direction (toward and away from an occupant) so that when a module cover 20 of the airbag apparatus 10 is pushed so as to move the airbag apparatus 10 towards the steering base 2, a horn switch is activated to blow a horn.

In one embodiment, a base plate 6 comprising a horn switch is disposed in front of the steering base 2 and the airbag apparatus 10 is joined to the base plate 6 with a guide shaft 41. Between the base plate 6 and the airbag apparatus 10, a coil spring 40 may be disposed that biases the airbag apparatus 10 away from the base plate 6. The airbag apparatus 10, the steering wheel 1, and the horn switch are described below.

Referring to FIG. 2, the airbag apparatus 10 includes a retainer 11, a folded airbag 13 mounted to the retainer 11 by operation of an airbag mounting ring 12, an inflator 14 operable to inflate the airbag 13, and a synthetic-resin module cover 20 covering the folded airbag 13. The module cover 20 is constructed to be torn open when the airbag 13 inflates.

Referring now to FIG. 3, the retainer 11 has a main plate 11*a* disposed in front of the steering base 2. The main plate 11*a* has an inflator opening 11*b* through which the inflator 14 is inserted. Around the opening 11*b*, insertion holes (the reference numerals are omitted) are provided to receive stud bolts 12*a* that project outward from the airbag mounting ring 12.

The proximal end of the airbag 13 comprises an inflator insertion hole (the reference numeral is omitted). The airbag 13 and the inflator 14 are frontally mounted to the retainer 11 by placing a periphery of the inflator insertion hole onto a periphery of the inflator opening 11*b* of the main plate 11*a*. The airbag 13 and the inflator 14 are then retained by operation of the airbag mounting ring 12. Stud bolts 12*a* of the airbag mounting ring 12 are inserted into bolt insertion holes (not shown) disposed around the inflator insertion hole and the bolt insertion holes of the main plate 11*a*.

The distal end of the inflator 14 is inserted from the back into the inflator opening 11*b*, and a flange 14*a*, disposed around the side periphery of the inflator 14, is placed on the periphery of the inflator opening 11*b*. The stud bolts 12*a* are also inserted into bolt insertion holes (the reference numeral is omitted) of the flange 14*a*. Nuts (not shown) are tightened to the stud bolts 12*a*, thereby securing the airbag 13, the airbag mounting ring 12, and the inflator 14 to the main plate 11*a*.

Still referring to FIG. 3, module cover mounting pieces 11*c* and 11*d* project from the outer rim of the main plate 11*a* (in this embodiment, the upper rim and the lower right and left rims) and are operable to secure the module cover 20 to the retainer 11. The mounting piece 11*c* disposed at the upper rim of the main plate 11*a* projects towards the back of the main plate 11*a*, while the mounting pieces 11*d* and 11*d* disposed on the lower right and left rims project towards the front of the main plate 11*a*.

Referring back to FIG. 2, the module cover 20 has a main surface 21 covering the front of the retainer 11 and a leg-like piece 22 projecting from the back of the main surface 21. The leg-like piece 22 is secured to the mounting pieces 11*c* and 11*d* with fasteners 11*e* or the like. The outer periphery 25 of the main surface 21 extends to the side of the airbag apparatus 10 relative to the leg-like piece 22, and covers the proximal ends of the spokes 3L, 3R, and 3D (FIG. 1).

Still referring to FIG. 2, the outer surface of the lower spoke 3D adjacent to the occupant forms, at the center of the steering wheel 1, a receding slope withdrawing from the occupant. The part adjacent to a steering column (not shown) relative to the receding slope forms a radial surface substantially perpendicular to the axis of the steering column. The lower rim 24 of the main surface 21 faces the radial surface with a specified space therebetween. The portion of the radial surface adjacent to the receding slope has a projecting strip 9 that constructs a half of the concealer.

As shown in FIGS. 1-3, the projecting strip 9 is substantially arcuate and extends, with almost the same radius, along the steering column.

Referring now to FIG. 2, the lower rim (outer rim) 24 of the module cover 20 which covers the spoke 3D is located outside the projecting strip 9, or in the vicinity of the outer periphery of the projecting strip 9. The lower rim 24 constructs the other half of a concealer. The lower end of the lower rim 24 (the end parallel to the axis of the steering column, the right end in FIG. 2) is located lower than the upper rim of the projecting strip 9 (on the right in FIG. 2).

Referring to FIG. 3, one aspect of the steering wheel 1 and the airbag apparatus 10 includes the interior of the airbag apparatus 10 being covered with the concealer constructed of the projecting strip 9 and projecting from the occupant-side surface of the lower spoke 3D and the lower rim 24 of the module cover 20. This structure prevents the interior of the airbag apparatus 10 from being viewed even if the steering wheel 1 were to be turned such that the spoke 3D approaches the so called three or nine o'clock position.

The concealer structure eliminates the need for mounting a separate blind cover to the module cover 20, thereby facilitating manufacture and providing an aesthetic appearance.

The structures of the retainer 11 of the airbag apparatus 10, the base plate 6, and the horn switch and are described below.

FIG. 3 illustrates one embodiment including a horn-switch-contact retaining piece 16 that projects outward from each of the right and left opposite rims and the lower rim of the main plate 11*a* of the retainer 11. The contact retaining pieces 16 project from the main plate 11*a* toward the occupant. From the ends of retaining pieces, extensions 16*a* extend towards the side of the airbag apparatus 10 in a direction substantially orthogonal to the front/back direction of the airbag apparatus 10.

One contact 30 of the horn switch (not shown) is disposed on the back of each extension 16*a*. Each extension 16*a* has an opening 16*b* for the guide shaft 41 to pass through and guide the front/back movement of the airbag apparatus 10.

A base plate 6 is disposed on the back of the main plate 11*a*. As shown in FIG. 3, the base plate 6 of this embodiment has a substantially "U" shape in plan view, and is disposed along the right and left sides and the lower side of the main plate 11*a*. Airbag apparatus support pieces 7 project outward from the both ends and the middle (the lateral center of the portion along the lower side of the main plate 11*a*) of the base plate 6 in the position where they overlap the contact retaining pieces 16 of the main plate 11*a*.

At the end of each support piece 7, an opposing portion 7*a* is provided which faces the back of the extension 16*a* of each contact retaining piece 16. The opposing portion 7*a* has a contact 31 opposed to the contact 30 of the extension 16*a*. To the opposing portion 7*a*, a guide-shaft mounting nut (the reference numeral is omitted) is fixed.

As shown in FIG. 2, the guide shaft 41 is fixed to the opposing portion 7*a* such that the proximal end of guide shaft 41 is screwed into the nut of the opposing portion 7*a* and projects from the opposing portion 7*a* toward the occupant. The guide shaft 41 passes through the front opening 16*b* of the extension 16*a* via an insulating spacer (the reference numeral is omitted). A flange (the reference numeral is omitted) is provided at the end of the guide shaft 41 and operates as a stopper.

Still referring to FIG. 2, a coil spring 40 is disposed around the guide shaft 41, compressed between the extension 16*a* and the opposing portion 7*a*.

In mounting the airbag apparatus 10 to the steering base 2, the base plate 6 (joined in advance to the retainer 11) is superposed on the front surface of the steering base 2, and a leg-like piece 6a is fixed to the steering base 2 with bolts or rivets (not shown).

In this embodiment, when the base plate 6 is joined to the steering base 2, the opposing portions 7a overlap with the bases of the spokes 3L, 3R, and 3D. As shown in FIG. 2, mounts 8 for supporting the opposing portions 7a are provided at the bases of the spokes 3L, 3R, and 3D. The opposing portions 7a come into engagement with the mounts 8.

The horn blowing operation of the steering wheel 1 with the airbag apparatus 10 is described below in conjunction with the embodiments of FIGS. 2 and 3.

When the module cover 20 is depressed, the module cover 20 and retainer 11 (the entire airbag apparatus 10) retract together. Because the base plate 6 is integrated with the steering wheel 1, the base plate 6 is not retracted even when the module cover 20 is depressed. Thus the contacts 30 and 31, retained by the retainer 11 and the base plate 6, respectively, come into close contact with each other thereby energizing and blowing the horn (not shown).

On release of the module cover 20, the retainer 11 is pushed back toward the occupant by the action of the coil spring 40 returning to its normal position shown in FIG. 2. Thus, the contacts 30 and 31 are separated, de-energizing and stopping the horn from blowing.

It is to be understood that the above-described embodiments are merely an example of the invention, and the invention is not limited to the embodiments described above.

For example, the embodiment has a structure in which when the module cover is depressed, the entire airbag apparatus is retracted to blow the horn. However, the invention may also be applied to a steering wheel and airbag in which only the module cover is retracted to blow the horn when the module cover is depressed.

Furthermore, although one embodiment disclosed includes a three-spoke type, the number of spokes is not limited to three. The concealer, comprising a projecting strip and an outer rim of a module cover, may be configured to operate with any spoke configuration.

The disclosure of Japanese Patent Application No. 2005-228355 filed on Aug. 5, 2005 is incorporated herein as a reference.

While the invention has been explained with reference to the specific embodiment of the invention, the explanation is illustrative, and the invention is limited only by the appended claims.

What is claimed is:

1. A steering wheel device comprising:
   a steering wheel with a plurality of spokes;
   an airbag apparatus disposed substantially central to the steering wheel and including an interior and a module cover, said module cover comprising a main surface, an outer periphery disposed around the main surface to cover the spokes, a lower rim situated at a part of the outer periphery, a leg piece extending from a part of the outer periphery, and an upper part situated as a part of the outer periphery outside the leg piece and having a length less than that of the leg piece;
   a concealer configured to conceal the interior of the airbag apparatus, the concealer being disposed at a gap formed between the outer periphery of the module cover and a surface of at least one of the spokes; and
   a back cover covering a back side of the steering wheel and having a portion disposed outside the leg piece adjacent the upper part to thereby cover the leg piece by the upper part and the portion of the back cover outside the leg piece.

2. A steering wheel device according to claim 1, wherein one of the spokes is arranged to be located adjacent to the occupant.

3. A steering wheel device according to claim 2, wherein one of the spokes includes a downward extending spoke when the steering wheel is in a position operable to guide a vehicle in a substantially straight forward direction, said concealer being disposed at the gap between the downward extending spoke and the module cover.

4. A steering wheel device according to claim 3, wherein the interior of the airbag is hidden from view when the downward extending spoke in a six o'clock position is rotated approximately 90 degrees to a three o'clock position.

5. A steering wheel device according to claim 4, wherein the steering wheel is a three-spoke steering wheel.

6. A steering wheel device according to claim 5, further comprising a horn switch disposed at least one of the spokes, the horn switch being configured to be concealed by the concealer.

7. A steering wheel device according to claim 1, further comprising a central steering base covered by the and back cover, wherein the airbag apparatus is moveably mounted to the steering base in front and backward directions.

8. A steering wheel device according to claim 7, wherein the moveably mounted airbag apparatus is operable to turn on a horn.

9. A steering wheel device according to claim 1, wherein the concealer comprises a projecting strip disposed at the surface of the spoke, and the lower rim of the module cover disposed close to a side of the projecting strip adjacent to an outer periphery of the steering wheel.

10. A steering wheel device according to claim 1, wherein said airbag apparatus further comprises a retainer having a mounting piece, said leg piece being fixed to the mounting piece at a portion covered by the back cover.

11. A steering wheel device according to claim 10, wherein said concealer is located at one side of the module cover, and said upper part is located between two spokes at a side opposite to the concealer.

\* \* \* \* \*